United States Patent Office 3,322,862
Patented May 30, 1967

3,322,862
VINYLIDENE CHLORIDE POLYMER COMPOSITIONS CONTAINING ETHYLENE/VINYL ALKANOATE COPOLYMER
Carl B. Havens, Rocky River, Robert A. Yurcisin, Seven Hills, and George H. Lacy, Rocky River, Ohio, assignors to The Dow Chemical Company, Midland, Mich., a corporation of Delaware
No Drawing. Filed June 24, 1964, Ser. No. 377,491
11 Claims. (Cl. 260—897)

This application is a continuation-in-part of application Ser. No. 235,110, filed Nov. 2, 1962, now abandoned.

This invention relates to polymeric compositions and, in particular, to polymeric compositions based on vinylidene chloride polymers that are particularly useful for the preparation of films for packagaing foodstuffs and the like materials.

Polymers and copolymers of vinylidene chloride with such comonomers as acrylonitrile, vinyl chloride, and lower alkyl acrylates have found wide use as films for packaging of foodstuffs and other articles. One such application has been in the poultry packing field. The prepared poultry are generally inserted into a bag of the film, the bag is evacuated and the film is sealed across the open end, and then the bag and contents are placed in hot water which causes the film to shrink tightly upon the contents. Another application has been in the household wrap field, for wrapping foodstuffs and the like.

Such films possess many useful properties, such as inertness, transparency, and low water vapor transmission rates which are desirable for packaging foodstuffs. However, prior vinylidene chloride polymer films suffered the disadvantages of becoming brittle and losing strength and other qualities at low temperatures. Additionally, such films are often difficult to seal and, frequently, after aging at room temperature for a few days, satisfactory seals cannot be obtained, that is, the seals peel open under pressure. Prior art attempts to plasticize these polymers have not generally been successful in overcoming these problems. The compatibility of liquid plasticizers with vinylidene chloride polymers is restricted which limits low temperature flexibility as well as sealability. Such liquid plasticizers also have a tendency to bleed out of the composition which is undesirable for packaging certain foods. Further, articles made from vinylidene chloride polymers tend to darken after prolonged exposure to elevated temperatures. This darkening is accompanied by a change in other physical properties of the polymeric product and is assumed to be evidence of partial decomposition.

Accordingly, it is a principal object of this invention to provide polymeric compositions based on polymers of vinylidene chloride which are adapted to be easily extruded into films, tubes and the like with conventional extrusion techniques and which films so-produced retain their flexibility and other properties at low temperatures such as are encountered in refrigerated foodstuffs and frozen foodstuffs, and which films additionally have excellent sealability and resistance to heat even after extended aging periods.

It is a further object of this invention to provide polymeric compositions which are relatively impermeable to water vapor and other gases.

The polymeric composition of this invention comprises a blend of (I) a normally crystalline vinylidene chloride selected from the group consisting of polyvinylidene chloride and interpolymers of at least about 70 percent by weight of vinylidene chloride with up to about 30 percent by weight of at least one monoethylenically unsaturated comonomer and (II) from 0.1 to about 30 percent by weight of the composition of an ethylene-vinyl alkanoate copolymer consisting of (1) from about 25 to 85 percent by weight ethylene and (2) complementarily between about 15 to 75 percent of a vinyl alkanoate wherein the acid portion of said vinyl alkanoate contains from 2 to about 8 carbon atoms.

Typical of the polymeric materials useful in the present invention are the polymers and copolymers of at least 70 percent by weight of vinylidene chloride with the remainder composed of one or more other monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, arrolein, allyl esters and ethers, butadiene and chloropropane. Known ternary compositions also may be employed advantageously. Representative of such polymers are those composed of at least 70 percent by weight of vinylidene chloride with the remainder made up of, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate, or vinyl chloride, allyl esters or ethers and vinyl chloride, butadiene and vinyl acetate, vinyl propionate, or vinyl chloride and vinyl ethers and vinyl chloride. Quaternary polymers of similar monomeric compositions will also be known.

The ethylene-vinyl alkanoate copolymers which impart low temperature flexibility and enhanced sealability to the vinylidene chloride polymer are copolymers which contain (1) from about 25 to 85 percent by weight of ethylene and (2) complementarily from about 15 to 75 percent by weight of a vinyl alkanoate, the acid portion of such vinyl alkanoate containing from 2 to 8 carbon atoms. Included within the advantageous definition of vinyl alkanoate may be mentioned vinyl acetate, vinyl propionate, vinyl butyrate, vinyl 2-ethyl hexoate, and the like, or suitable mixtures thereof.

The polymeric blends of the invention may include plasticizers, such as dioctyl phthalate, dibutyl sebacate, and the like, in the range of about 2 to 10 percent by weight of the composition. The polymer blend may also include antioxidants, light stabilizers, and other additives known in the art which do not deleteriously affect the properties of the film.

When preparing the polymeric compositions of the invention, it is important that a thorough and complete intimate mixing of the ethylene-vinyl alkanoate copolymer and vinylidene chloride is effected. This is best accomplished by blending the two polymeric materials while they are in a solid, powered or pulverant form. However, any means suited for the purpose may be employed such as mixing the polymers in molten form. This is usually less desirable, though, because of the thermal degradation of the polymers when maintained at melting temperatures.

Films and related shaped articles can be fabricated from the compositions of the invention by any of the conventionally employed fabricating or extruding techniques. Of particular advantage is to employ the bubble technique for making films in tubular form. In this regard, it has been found that the addition of the herein described ethylene/vinyl alkanoate copolymers significantly enhances extrusion efficiency and reduces the necessity for time-consuming cleaning of the extrusion dies; and further significantly reduces time consuming shut-downs resulting from frequent breaking of the film bubble.

Films prepared from the present compositions can be used in either oriented or unoriented condition. Thus, unoriented films are especially well suited for preparing laminate structures. The unoriented films provide excellent extensibility to the laminate structure as well as providing desirable permeability.

The compositions of the present invention are useful in other processes, such as molding, slot extrusion, and other thermal fabrication techniques, to form films, fibers, foils, molded articles, and other forms having the superior properties.

The invention will be illustrated with the following examples wherein all percentages and parts are by weight.

Example 1

A crystalline copolymer composed of about 73 percent by weight vinylidene chloride and about 27 percent by weight of vinyl chloride was prepared by emulsion polymerization, utilizing potassium persulfate as the catalyst and the dihexyl ester of the sodium salt of sulfosuccinic acid as the emulsifier in a manner well known in the art. The so-formed dried crystalline polymer was dry blended with 0.5 percent by weight of magnesium oxide.

Separate portions of the crystalline polymer, as described herein, were individually blended with varying amounts of dibutyl sebacate, a plasticizer, and varying amounts of a copolymer consisting of 67 percent by weight ethylene and 33 percent by weight vinyl acetate, said ethylene-vinyl acetate copolymer having a melt index (ASTM 1238–57T) of 25, a density of 0.95 g./cc. at 30° C., a refractive index, N25/D of 1.482; and an inherent viscosity at 30° C. (0.25 percent by weight in toluene) of 0.78.

Samples of the polymer blends were subsequently individually thermally extruded using standard bubble techniques into oriented film having a thickness of about 0.001 inch. Certain samples of the film in flattened, tubular form and bag lengths were formed into flow moldings and tested for flexural modulus. Other samples of the film were cooled to about 10° F. and tested for flexibility. Still other similar film samples were electronically sealed at one end.

A bag with an exceptionally good seal is one, which, when subjected to burst tests, will rupture at the initial joinder of the two film surfaces (initial joinder here means the line of joinder as viewed from inside the bag). A partial peel is evidenced by a separation part way or longitudinally through the seal before rupture. A complete peel is evidenced by escape of the air through the outer edge of the seal with no actual rupture of the film. Bags showing partial peel are somewhat objectionable (and full peel is highly objectionable) in that this indicates probable failure of the seal when an object (e.g., poultry) is dropped into the bag and when film is caused to shrink down tightly over the object.

Other film samples were tested for oxygen transmission and flexibility at 0° F.

In all of the tables of this example, the column headings have the following meanings:

Flexural modulus (° F.)—The temperature at which a flow molding possesses a modulus of $2.5 \times 10^5$ lbs./in.$^2$ in flexure.

$O_2$ transmission—cc. at STP/100 in.$^2$/24 hours/mil at 1 atm. driving force.

Cold flex—Number of hand flexes at designated temperature to produce rupture.

In Tables I, II and III, the physical properties of individual test samples of 73 percent vinylidene chloride-27 percent vinyl chloride copolymer plus various percentages of dibutyl sebacate and a copolymer consisting of 67 percent ethylene and 33 percent vinyl acetate are tabulated. All values in Tables I, II and III are average values of several tests.

TABLE I.—MOLDINGS

| Sample No. | Ethylene-Vinyl Acetate Copolymer Content, Percent | Dibutyl Sebacate, Percent | Flexural Modulus, 0° F. |
| --- | --- | --- | --- |
| For Comparison: | | | |
| 1 | 0 | 12.1 | −6 |
| 2 | 0 | 9.5 | 14 |
| This Invention: | | | |
| 3 | 5 | 9.5 | −6 |
| 4 | 10 | 9.5 | −13 |

TABLE II.—ORIENTED FILM

| Sample No. | Ethylene-Vinyl Acetate Copolymer Content, Percent | Dibutyl Sebacate, Percent | Flexibility at 10° F. | Seal Burst Strength, p.s.i. | Percent of Bags Showing Partial Peeling |
| --- | --- | --- | --- | --- | --- |
| For Comparison: | | | | | |
| 5 | 0 | 12.1 | Flexible | 8–11.9 | 100 |
| 6 | 0 | 9.5 | Stiff | 10–15 | 0 |
| This Invention: | | | | | |
| 7 | 2 | 9.5 | Flexible | | |
| 8 | 5 | 9.5 | ...do... | 13.4–14 | 0 |
| 9 | 10 | 9.5 | Very Flexible | 11.2–12.5 | 0 |

TABLE III.—ORIENTED FILMS

| Sample No. | Ethylene-Vinyl Acetate Copolymer Content, Percent | Dibutyl Sebacate Percent | $O_2$ Transmission | Cold Flex 0° F. |
| --- | --- | --- | --- | --- |
| For Comparison: | | | | |
| 10 | 0 | 9.5 | 18.5 | <5 |
| This Invention: 11 | 2 | 7.3 | 10.5 | >5 |

Example 2

A crystalline copolymer composed of about 85 percent by weight vinylidene chloride and about 15 percent by weight of vinyl chloride was prepared by suspension polymerization utilizing a mixture of lauroyl peroxide and benzoyl peroxide as the catalyst and a cellulose hydroxypropyl methyl ether having a viscosity of about 400 centipoises in a 2 percent aqueous solution of such ether measured at 20° C. The so-formed dried crystalline polymer was then dry blended with 4.5 parts by weight of acetyl tributyl citrate.

Separate portions of the crystalline polymer as described herein, were individually dry blended with varying amounts of a copolymer consisting of about 72 percent by weight ethylene and about 28 percent by weight vinyl acetate, having a melt index of 3.0, a density of 0.95 gram/cc. at 30° C., a refractive index N25/D of 1.485 and an inherent viscosity at 30° C. (0.25 percent by weight in toluene) of 0.90.

Samples of the polymer blends were subsequently thermally extruded using standard bubble techniques into oriented film having a thickness of about 0.001 inch. Individual 25-foot samples of each of the films were separately wound on white paper cores and stored in an oven maintained at 85° C. for varying periods of time. Other samples were separately stored in an oven maintained at 140° C. for varying periods of time. The amount of decomposition of each film was judged from the darkening of the various samples and this in turn was evaluated by using an arbitrarily adapted numerical scale from 1 to 8 wherein 1 refers to a colorless product at the top of the scale and 8 refers to a very dark brown product at the bottom of the scale. The following Table IV illustrates the percent of the ethylene-vinyl acetate copolymer used, the oven testing conditions utilized and the color rating of each test sample.

stabilized. With regard to the latter, a composition was prepared by intimately blending 10 percent by weight of a copolymer of 67 percent by weight ethylene and 33 percent by weight vinyl acetate as described herein with 90 percent of a copolymer of 73 percent vinylidene chloride and 27 percent vinyl chloride. This blend was fabricated by thermal extrusion without further plasticization or stabilization into an oriented film. The properties of this film showed about the same magnitude improvement over an unblended vinylidene chloride copolymer film as is evidenced in the foregoing example.

Similar good results are obtained from any composition comprising (I) a normally crystalline vinylidene chloride polymer consisting of (a) about 70 to 100 percent by weight of vinylidene chloride and (b) 0 to 30 percent by weight of at least one monoethylenically unsaturated comonomer and (II) from 0.1 to 30 percent by weight of the composition of an ethylene-vinyl alkanoate copolymer consisting of (1) from about 25 to 85 percent

TABLE IV.—HEAT STABILITY OF ORIENTED FILMS

| Sample No. | Percent Ethylene/Vinyl Acetate Copolymer | Color Rating of Samples Heated at 85° C. | | | | | Color Rating of Samples Heated at 140° C. | | | | |
|---|---|---|---|---|---|---|---|---|---|---|---|
| | | 0 Hrs. | 72 Hrs. | 144 Hrs. | 168 Hrs. | 216 Hrs. | 60 Min. | 120 Min. | 180 Min. | 270 Min. | 330 Min. |
| For Comparison: 12 | 0 | 1 | 1+ | 3 | | | 3 | 8 | | | |
| This Invention: | | | | | | | | | | | |
| 13 | 0.5 | 1 | 1+ | 1+ | 1+ | | 1+ | 4 | | | |
| 14 | 2 | 1 | 1 | 1+ | 1+ | | 1+ | 3 | | | |
| 15 | 10 | 1 | | 1+ | | 1+ | 1+ | | 2+ | 3 | 4 |

Example 3

In each of a series of experiments, separate portions of the crystalline copolymer of Example 2, were individually dry blended with varying amounts of a copolymer consisting of about 67 percent by weight ethylene and about 33 weight percent vinyl acetate having a melt index (ASTM 1238–57T) of 25, a density of 0.95 gram/cc. at 30° C., a refractive index, N25/D of 1.482; and an inherent viscosity at 30° C. (0.25 percent by weight in toluene) of 0.78.

Samples of the polymer blends were subsequently individually extruded into oriented film and evaluated for decomposition at a temperature of 140° C. as described in Example 2. The following Table V illustrates the percent of the ethylene-vinyl acetate copolymer used, the oven testing conditions utilized and the color rating of each test sample.

TABLE V.—HEAT STABILITY OF ORIENTED FILMS

| Sample No. | Percent Ethylene/Vinyl Acetate Copolymer | Color Rating of Samples Heated at 140° C. | | | |
|---|---|---|---|---|---|
| | | 60 Min. | 120 Min. | 180 Min. | 270 Min. |
| For Comparison: 16 | 0 | 2 | 5 | 7 | |
| This Invention: | | | | | |
| 17 | 0.1 | 2 | 4 | 6 | |
| 18 | 15 | 1 | 1 | 2 | 3 |
| 19 | 20 | 1 | 1 | 2 | 3 |
| 20 | 30 | 1 | 1 | 2 | 2+ |

All of the films contained the indicated amounts of ethylene-vinyl acetate copolymer were easily extrudable using the herein referred to "bubble-type" extrusion techniques. Further, extrusion of such films resulted in considerably less contamination of the extrusion die, as compared to the similarly formed, unmodified control.

From the data presented, it can be seen that the addition of the indicated amounts of the specified ethylene-vinyl acetate copolymer to the normally crystalline vinylidene chloride polymer results in blends having appreciably enhanced physical properties. Equally good physical properties are also obtained when the vinylidene chloride polymer compositions containing such ethylene-vinyl acetate copolymers are unplasticized and unby weight ethylene and (2) complementarily, between about 15 to 75 percent of a vinyl alkanoate wherein the acid portion of said vinyl alkanoate contains from 2 to about 8 carbon atoms. It has been found, however, that ethylene-vinyl alkanoate copolymers containing less than about 15 percent by weight of vinyl alkanoate are generally insufficient compatible with the vinylidene chloride polymers. Further, copolymers containing in excess of about 75 percent by weight vinyl alkanoate generally do not provide the herein described advantageous low temperature flexibility. Still further, amounts of such copolymers in excess of about 30 percent by weight, based on the weight of the vinylidene chloride polymer, often retards the extrusion efficiency and, in addition, affects the clarity of the so-formed film to the point of producing undesirable opaqueness, amounts of such copolymers less than about 0.1 percent by weight are generally insufficient to provide the desirable properties described herein.

What is claimed is:

1. A polymeric composition comprising a blend of (I) a normally crystalline polymer selected from the group consisting of polyvinylidene chloride and interpolymers of at least about 70 percent by weight of vinylidene chloride with up to about 30 percent by weight of at least one other monoethylenically unsaturated comonomer and (II) from 0.1 to 30 percent by weight of the composition of an ethylene-vinyl alkanoate copolymer consisting of (1) from about 67 to 72 percent by weight of ethylene and (2) between about 28 and 33 percent by weight of a vinyl alkanoate wherein the acid portion of said vinyl alkanoate contains from 2 to about 8 carbon atoms said copolymer having a melt index of between about 3 and about 25 as determined by ASTM test No. 1238–57T.

2. The composition as claimed in claim 1, wherein said normally crystalline polymer is a copolymer of vinylidene chloride and vinyl chloride.

3. The composition as claimed in claim 2, wherein said normally crystalline polymer is a copolymer of about 73 percent by weight of vinylidene chloride and about 27 percent by weight of vinyl chloride.

4. The composition as claimed in claim 2, wherein said normally crystalline polymer is a copolymer of about 85 percent by weight of vinylidene chloride and about 15 percent by weight vinyl chloride.

5. The composition as claimed in claim 1, wherein said ethylene-vinyl alkanoate copolymer is a copolymer of ethylene and vinyl acetate.

6. A thermally fabricated article comprising a homogeneous blend of (I) a normally crystalline vinylidene chloride polymer selected from the group consisting of polyvinylidene chloride and interpolymers of at least about 70 percent by weight of vinylidene chloride with up to about 30 percent by weight of at least one monoethylenically unsaturated comonomer and (II) from 0.1 to 30 percent by weight of the article of an ethylene-vinyl alkanoate copolymer consisting of (1) from about 67 to 72 percent by weight of ethylene and (2) complementarily between about 28 and about 33 percent by weight of a vinyl alkanoate wherein the acid portion of said vinyl alkanoate contains from 2 to about 8 carbon atoms said copolymer having a melt index of between about 3 and about 25 as determined by ASTM test No. 1238-57T.

7. A thermally fabricated article as claimed in claim 6 wherein said article is an oriented film.

8. The oriented film as claimed in claim 7 wherein said normally crystalline polymer is a copolymer of vinylidene chloride and vinyl chloride.

9. The oriented film as claimed in claim 8, wherein said normally crystalline polymer is a copolymer of about 73 percent by weight vinylidene chloride and about 27 percent by weight of vinyl chloride.

10. The oriented film as claimed in claim 8, wherein said normally crystalline polymer is a copolymer of about 85 percent by weight vinylidene chloride and about 15 percent by weight of vinyl chloride.

11. The oriented film as claimed in claim 7, wherein said ethylene-vinyl alkanoate copolymer is a copolymer of ethylene and vinyl acetate.

References Cited
UNITED STATES PATENTS

| | | | |
|---|---|---|---|
| 3,022,263 | 2/1962 | Orthner et al. | 260—897 |
| 3,076,781 | 2/1963 | Frey | 260—897 |
| 3,125,545 | 3/1964 | Van Cleve et al. | 260—897 |
| 3,210,307 | 10/1965 | Paoloni | 260—897 |

SAMUEL H. BLECH, *Primary Examiner.*

MURRAY TILLMAN, *Examiner.*

T. G. FIELD, JR., *Assistant Examiner.*